US 6,546,304 B2

(12) United States Patent
Thorvaldsson et al.

(10) Patent No.: US 6,546,304 B2
(45) Date of Patent: Apr. 8, 2003

(54) INTEGRATED MEAT PROCESSING AND INFORMATION HANDLING METHOD

(75) Inventors: Bjorn Thorvaldsson, Mosfellsbaer (IS); Kristinn A. Kristinsson, Reykjavik (IS); Petur Gudjonsson, Reykjavik (IS)

(73) Assignee: Marel Hf., Reykjavik (IS)

( * ) Notice: Subject to any disclaimer, the term of this patent is extended or adjusted under 35 U.S.C. 154(b) by 0 days.

(21) Appl. No.: 09/866,579

(22) Filed: May 29, 2001

(65) Prior Publication Data

US 2002/0004366 A1 Jan. 10, 2002

Related U.S. Application Data (60) Provisional application No. 60/207,278, filed on May 30, 2000.

(30) Foreign Application Priority Data

May 30, 2000 (IS) .................................. 5519/2000

(51) Int. Cl.$^7$ .................................................. G06F 19/00
(52) U.S. Cl. ........................................ 700/115; 700/116
(58) Field of Search ......................... 700/115, 116, 700/112

(56) References Cited

U.S. PATENT DOCUMENTS

| 4,597,495 | A | * | 7/1986 | Knosby | ............ 104/88.03 |
| 5,255,197 | A | * | 10/1993 | Iida | ............ 700/108 |
| 5,478,990 | A | * | 12/1995 | Montanari et al. | ............ 235/375 |
| 6,104,966 | A | * | 8/2000 | Haagensen | ............ 221/1 |
| 6,148,249 | A | * | 11/2000 | Newman | ............ 700/223 |
| 6,267,661 | B1 | * | 7/2001 | Melville | ............ 452/155 |

* cited by examiner

Primary Examiner—Leo Picard
Assistant Examiner—Alexander Kosowski
(74) Attorney, Agent, or Firm—Pillsbury Winthrop LLP (57) ABSTRACT

The present invention relates to a process and an application for handling information in relation to meat being conveyed through a number of processing stations. The information is used to trace the processing history of a piece of meat, including its origination. The ability to trace the processing history may be used e.g. in order to trace back sources of contamination and for verification of the status and quality, weight etc. of the meat. The information is furthermore useful for the workers processing the meat at the stations or useful for the control and management of the meat processing plant.

46 Claims, 8 Drawing Sheets

Performance and yield, trimmers

Period: 08/17/1999 - 08/17/1999
Employees (All), Process units (All), Flow time hour (All), Process periods (All), Shifts (All)

10 Employee 1, Shift 1

Activity: Butterfliers

Pr. period: 108 (08/17/1999 3:00 AM-08/17/1999 9:45 AM)

| Material | Kg | Product % | P. Yeild | O. Yeild | Total % | Defectives | Breakdown |
|---|---|---|---|---|---|---|---|
| Butterflys | 81.7 | 54.3% | 44.5% | 65.6% | 35.6% | 0.00 | |
| Tenders | 20.4 | 13.6% | 58.0% | 85.0% | 8.9% | 0.00 | |
| Wings | 48.4 | 32.1% | | 85.8% | 21.1% | 0.00 | |
| Trimmings | 78.9 | | | | 34.4% | | |

Product Total: 138.5

| | Thoughtput kg/hr | | | | | Defects Avg. | Input | Hours |
|---|---|---|---|---|---|---|---|---|
| Results: | 99.1 | 44.5% | | 65.6% | | 0.00 | 229.5 | 1.7 |
| Targets: | 100.8 | 58.0% | | 85.0% | | 1.00 | | |
| Average: | 81.3 | 44.5% | | 85.8% | | 0.00 | | |

Activity: Butterfliers

Pr. period: 107 (08/17/1999 2:45 AM-08/18/1999 3:00 AM)

Material    Kg    Product %    Total %    Defectives    Breakdown

FIG. 9

File  Setup  Properties  Language  Help

Print  Page  Width  100%  Export

Employee time overview

*Employee time overview*

Period - 01/01/1999 - 01/07/1999

| Member | Member's Name | Members |
|---|---|---|
| 17171 | Aster Farrell | 54:17 |
| 22743 | Albert Deller | 124:21 |
| 59832 | Albert U. Tesser | 121:28 |
| 35533 | Albert U. Murphy | 114:21 |
| 37821 | Albert J. Trum | 122:32 |
| 39024 | Alice D. Framptom | 133:45 |
| 44261 | Alice Murphy | 162:43 |
| 18333 | Alice Ireal | 162:38 |
| 32275 | Allen B. Malone | 126:13 |
| 17675 | Allen McMurry | 142:17 |
| 38335 | Allen J. Candy | 126:52 |
| 33293 | Allen Meltz | 148:34 |
| 17193 | Andrea Kenney | 145:32 |
| 39380 | Andrew Furry | 124:54 |
| 56891 | Andrew Underly | 154:53 |
| 32874 | Andrew Brampton | 161:48 |
| 68246 | Andrew Stevens | 166:52 |
| 55932 | Andrew Miles | 108:13 |

INTEGRATED MEAT PROCESSING AND INFORMATION HANDLING METHOD

The present application claims priority to U.S. Provisional Application No. 60/207,278, filed May 30, 2000, and ICELAND 5519, filed May 30, 2000. therein.

BACKGROUND OF THE INVENTION

1. Field of the Invention

The present invention relates to a process and an application for handling information in relation to meat being conveyed through a number of processing stations. The information is used to trace the processing history of a piece of meat, including its origination. The ability to trace the processing history may be used e.g. in order to trace back sources of contamination and for verification of the status and quality, weight etc. of the meat. The information is furthermore useful for the workers processing the meat at the stations or useful for the control and management of the meat processing plant.

2. Description of Related Art

Applications comprising a conveyor system for meat in combination with electronic storage of information about the meat, such as information about the weight of the meat exist. Known systems typically comprise means for reading information from the provider of the meat, e.g. by use of a bar code reader and means for printing out the information e.g. for labelling packages with meat. The known systems are able to receive information related to a piece of meat and to pass the information along with the meat. However the known systems are adapted to convey the meat in batches so that the information about the meat is stored relative to a batch. As an example the meat from one animal or from a quarter of an animal is placed in one bin or hung on one hook. When the meat is cut into pieces these pieces are transported and stored together and in this way it is possible to trace the origination of the meat.

The present invention relates to a process wherein the position and information is traced in relation to every single piece of meat. This process offers enhanced flexibility towards when and where to process the individual pieces of meat. Two pieces of meat originating e.g. from the same quarter or hindquarter etc. may thus be processed in different places or at different time.

Due to the tracing of information related to the individual pieces of meat it is possible to provide the workers with processing instructions or with support for where, when and how to process the meat.

Furthermore the present invention relates to system capable of tracing all information related to the meat and to relate the information to information about the control and management of the meat processing facility or plant. The tracing can be performed by relating the information about the meat to information related to the purchase of meat or to the payment of the workers and to store the information throughout the processing of the meat.

SUMMARY OF THE INVENTION

According to a first aspect the present invention relates to an integrated meat processing and information handling method using a tracing method adapted to trace a position of a piece of meat on a conveyor, said meat processing and information handling method comprising the steps of:

storing in a computer system information related to a piece of meat, transferring the piece of meat between a number of processing stations while the position of the meat is traced by the computer system, for at least one processing station storing in the computer system further information related to the piece of meat or related to the processing of the piece of meat and providing at least one processing station with information from the computer system.

The position of an item such as a piece of meat on a conveyor belt can be traced e.g. by means of sensors arranged in a number of places along the conveyor belt. When a number of pieces of meat are placed sequentially, e.g. in the beginning of the conveyor belt. The position of each piece of meat can be determined by tracing the number of pieces passing the sensors placed along the conveyor belt and by relating this number to the sequence of which the meat were placed on the conveyor. The pieces of meat can also be traced by monitoring their displacement, e.g. by keeping track of index pulses in the conveyor system or simply by monitoring the order in which pieces of meat enter and leave a conveyor belt. Another way of tracing the position of the meat on the conveyor belt is to attach the meat to a bin with an identification tag or to attach an identification tag directly to the meat.

The information related to a piece of meat could be information related to the origination of the meat such as from which farm or from which animal that piece of meat originated.

This is typically information that would be stored for a piece of meat as the meat enters the first processing station of a meat processing plant. Each time the meat is divided into smaller cuts from the meat, each cut may be associated with this information. Information related to the processing of the meat, such as related to a worker or a machine doing the processing or related to the quality of the processing, the weight of the meat, the time of the processing or the duration of the processing may be added to the information whenever such information is relevant to the meat or to the processing facility etc.

When the piece of meat is being conveyed between the processing stations the computer system must trace the position of that piece of meat so that the information related to the meat can be recalled and used e.g. for training purpose, for support of the processing worker or machine, for statistical purpose, for labelling the meat e.g. with weight and quality or origination information, for quality inspection of the meat etc. As an example a worker or a machine can recall the information related to a piece of meat and use the information to determine good ways of cutting the meat according to a pre-selected criterion. The criterion could be which cut is the fastest, which cut gives the highest profit, which cut is the presently most demanded cut by the customers, which cuts are optimal in relation to the quality of the specific piece of meat, which cuts fit given weight criteria etc.

According to a preferred embodiment the method further comprises the steps of cutting the piece of meat into at least two pieces of meat and storing in the computer system information related to the at least two pieces of meat.

The steps of cutting a piece of meat into a number of pieces of meat typically involve a problem with the tracing of the origination of the meat. One solution is to store all pieces of meat originating from one piece of meat in the same bin. Another solution is to store information related to a piece of meat, e.g. information related to the origination of a piece of meat and then trace the position of that piece of meat. In this way one logistic problem is solved in relation to the order of the production. Instead of having to process all meat related to the same origination subsequently to all cuts of a certain kind, no matter if they originate from different animals or even from different farms may be processed subsequently. In this way the workers may get used to doing one specific cut which enables a higher degree of repetitive work and a higher degree of specialization among the workers, or in case of automatic processing, a higher degree of specialization of the machines which could lead to higher efficiency.

The information related to the meat can be analyzed and used for controlling a processing station. As an example, the information can indicate that a piece of meat originates from a farm or from a country where a specific set of rules applies for the cutting of the meat. Such rules could be related to the cutting sequence and which part of the meat is to be used and which is to be destroyed. This could, e.g., be due to "Mad Cow Disease" or salmonella. As another example, the meat could be in a certain condition—too much fat, too high bone weight etc.—so that manual processing would be too expensive and therefore automatic processing of the meat, e.g. for production of burger meat etc. should be selected. It could also be that a piece of meat could be cut into a varying number of cuts, wherein the cuts that match the meat on stock and order situation should be selected.

Information related to a number of pieces of meat could also be analyzed in order to provide information related to the origination of the pieces of meat, e.g. a number of pieces of meat having a certain characteristic. These might relate to a high fat percentage, certain bacteriological states or conditions etc. By means of the information symptoms and characteristics relating to a farm, a region or a country may be provided. E.g. if a certain disease is found in a number of pieces of meat, it may be analyzed if the pieces originate from one single animal or from one farm, a region or a country.

Another example is if a number of pieces of meat is infected by a disease and by analyzing the information it has been found that the pieces originate from a number of animals. The information may then be analyzed so as to find out if the disease may be related to processing by a specific processing station or a specific worker and it may be found that the disease has originated from an infected transportation bin, a worker etc.

It could also be the case that a number of pieces of meat are in a bad condition or even wasted due to wrong treatment of the meat. As an example, the meat may have been stored in a warm processing room for too many hours, a bone has been crushed so that the meat is filled with bone fragments etc. By analyzing the information from a number of wasted pieces of meat it may be found what happened to the meat and faults in the processing may be corrected.

According to another aspect of the invention the information may be used to trace the amount of resources spent on a piece of meat, e.g. how much automatic processing time and how much manual processing time. The information can be used to forecast a price and cost indication showing the profit or loss of the processing of a specific piece of meat. It may further be found that all meat originating from a specific farm takes longer time to process due to fat percentage or similar conditions or it may be found that one worker or one processing station has longer processing time than other. It may even be found that one worker is fast at processing one type of meat whereas the same worker is slow at processing another type of meat. By monitoring the information about the duration of processing for each worker, the performance of a worker may be compared to a reference value, such as the average processing time for a specific piece of meat or such as a performance related to a piece-contract for paying the worker. The worker can at the same time be provided with information related to this comparison, such as: "you are faster than average" or "you have earned 10% bonus today". Similarly the management for selection of workers for specific tasks may use the information.

Another aspect of the invention is related to a time stamp of the processing or of each of the processes included in the processing of the meat. Such a time stamp could ease the investigation if a piece of meat is found with a certain defect. The information may then be used to trace all meat processed at the same time of the same day, and/or at the same time at the same processing stations or by the same worker.

For processing stations operated by workers, the information may be used for guiding the worker through his work. For example, the worker may be provided with a graphical picture showing how to cut exactly the piece of meat lying in front of him on the processing table. Such guidance can be used for training new employees or for obtaining a higher degree of flexibility in the working staff. One example is if the management decides that the workers should be shifted around between the individual processing stations so as to obtain knowledge about many processes. In this way one worker can easily take over another worker's place in case of absence. By means of the graphical presentation of instructions the worker can be working within a new area within a very short time.

According to a second aspect, the present invention relates to a computer program product for a digital computer, said computer program product comprising software code for performing the before mentioned method.

According to a third aspect the present invention relates to a meat conveyor for transfer of meat between a number of operation stations said conveyor comprising:

means for tracing a position of a piece of meat on the conveyor means for transporting the meat between the stations means for electronically storing information related to the meat computing means for processing the stored information, means for communication between the stations and the computing means, and means for automatic recognition of the meat and/or a worker.

BRIEF DESCRIPTION OF THE DRAWINGS

A system based upon a preferred embodiment of the invention will now be described in detail with reference to the drawings in which.

DESCRIPTION OF THE INVENTION

Figure 1:
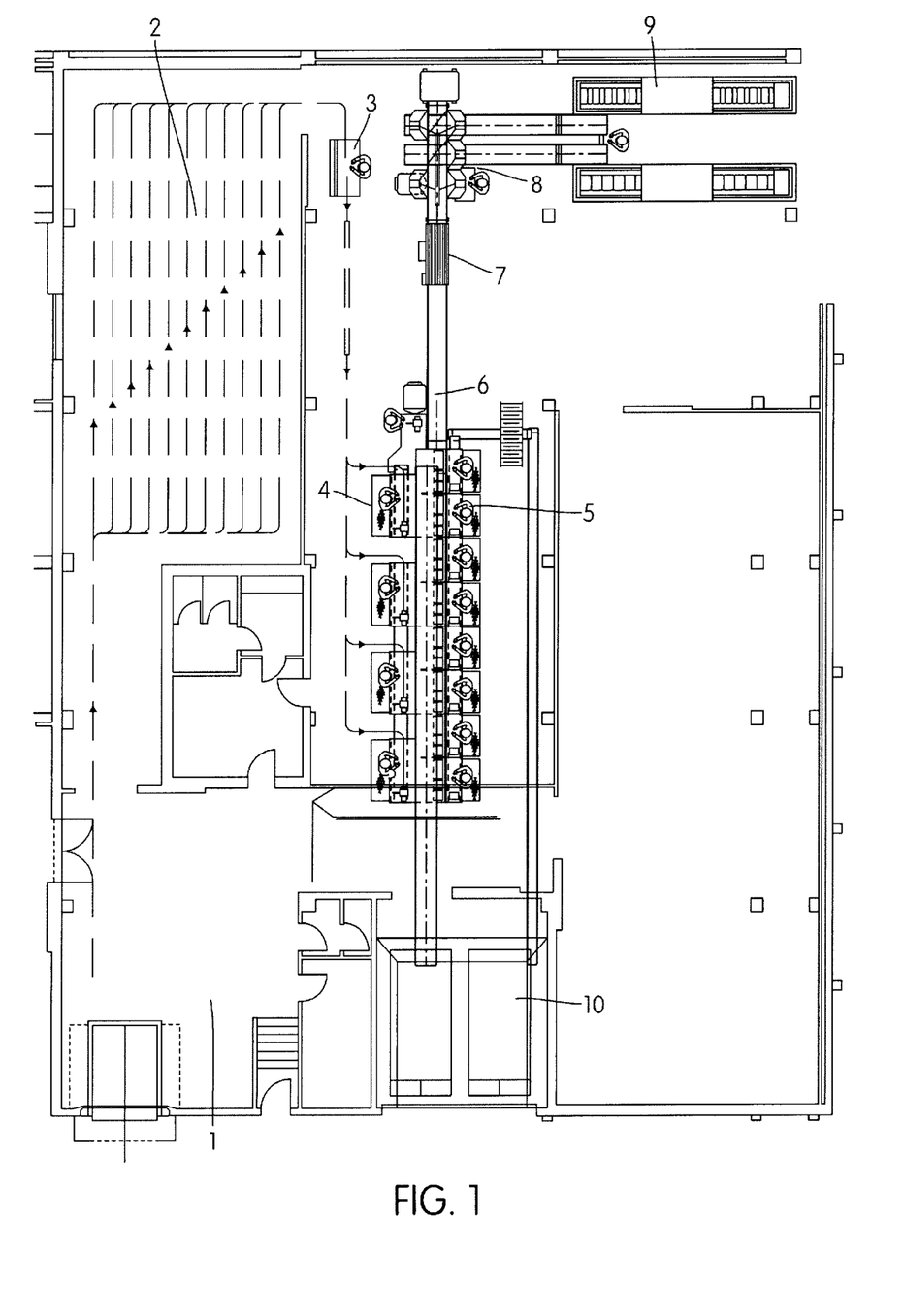
FIG. 1 shows a meat processing plant.

FIG. 1 shows a meat processing facility where the meat is received in the form of whole animals or parts of animals such as quarters. The arrow shows the process way through the facility wherein the meat is being registered, cut into pieces, sorted e.g. relative to quality, weight or type of product and finally packed and labelled.

Typically the meat is sorted relative to the categories: fat, bone, trims and product where the product can be a T-bone, a sirloin etc. and/or the meat is sorted relative to categories such as pre-determined weight and/or quality such as fat percentage etc.

Referring to FIG. 1, a meat processing facility typically comprises a meat receiving area 1, a marshalling area 2, a pre-saw area 3, a boning area 4, a slicing area 5 where the de-boned meat is cut into pieces, an area for bone in loin 6 (bones with meat), a dynamic scale 7 for weighing the meat, static scale 8 for weighing the trim, a packing area 9 for packing and labelling vacuum packed cuts and a number of containers 10 for fat or bones etc.

A conveyor system moves the meat between each of the areas or between processing stations in each of the areas. Presently, the conveyors of meat processing facilities are typically adapted to convey the meat in batches such as in bins or on hooks. In order to enable that the origination of a piece of meat can be traced, e.g. in order to find out from which animal or from which farm the meat originated, meat from an animal or at least from a quarter of the animal is stored and transported in one batch.

This invention is not limited to conveyor systems transporting batches of meat. It is one aspect of the invention to trace the position and information related to every single piece of meat, thus the following description relates to a meat processing facility wherein the pieces of meat are transported individually. An information system traces all information about each piece of meat, e.g. after each processing station. In this way the meat from one animal may be processed in different areas of the processing facility or over a period of time, e.g. the hindquarter could be processed in one week or in one area and the forequarter may be processed in another week or area. The information is communicated to and from the system by means of terminals with screens, keyboards etc., barcode readers, vision or scanning sensors, scales, motor controllers of the conveyor etc.

The system is adapted to handle information such as:
ID-tag (identification numbers pointing to origination of the meat),
Weight and type of cut (sirloin etc.),
Weight and type of animal (beef, pork etc),
Slicer ID (worker no.),
De-boner ID (worker no.),
Date and time of processing (data and time the meat was processed),
Serial no (consecutive numbering of meat passing through), and
Time used to process a specific cut (number of minutes).

No matter if the meat is conveyed or if it is placed in a bin waiting to be processed etc., the system traces the position of the meat and the information related to the meat. The meat does not need to be conveyed in batches such as in bins or on hooks because the system keeps track of the position and an information record for every single piece of meat.

The information related to the meat may be used not only for supporting the processing and conveying of the meat, as described above, but also for gathering useful information related to the control and management of the meat processing facility or plant. This could be information related to the purchase of meat or to the payment of the workers.

One example is to trace the time used to process a specific cut over time and to compare the information with information on the processing time of the individual workers so as to determine the capability of the workers, or to compare the information with information about the weight and/or quality of the cuts or information about the quality of the meat. An interesting aspect is to find out if a certain farm always delivers meat that takes a longer time to process or if a certain worker always has higher processing time—and maybe also higher processing quality.

In the following an example of meat processing according to the invention is described.

Products arriving have an ID-tag, e.g. in the form of barcodes. The ID-tag contains, e.g. a serial number or similar identification. The information from the ID-tag may be downloaded into a RF-tag (Radio Frequency tag) or similar device for automatically reading and writing information or it may simply be used as it is. No matter if the information is downloaded into an RF-tag, if it is a barcode or any other means of tag, the tag may identify the meat throughout the processing by means of RF-readers, barcode readers etc.

Figure 2:
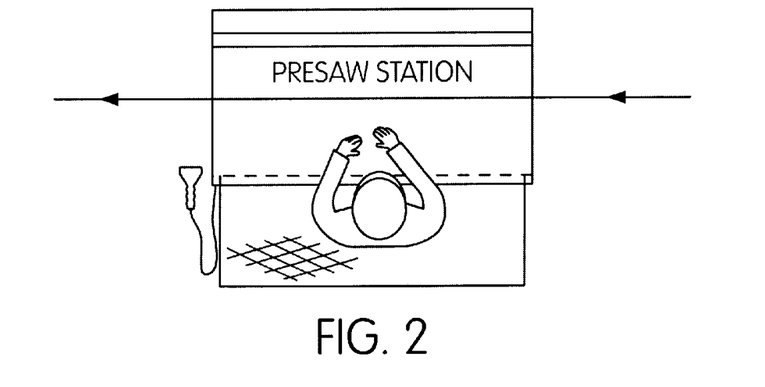
FIG. 2 shows one processing station of the plant—a pre-saw station.

FIG. 2 shows an example of a pre-saw station. The pre-saw station is a critical part of the system since all quarters entering the trimming line have to be processed here, registered to the system and assigned to a specific slicing station. The procedure for this first phase could be as follows:

Quarters enter the pre-saw station from the marshalling area. The operator performs the necessary work. When the work is performed the operator decides which slicing station will receive the quarter. The operator uses a tag reader (e.g. a R.F reader or a barcode reader) to read the origination identification, and the product is moved directly to a specific boning station. The assignment of the meat to a specific boning station is done e.g. by means of an information terminal or by means of a simple button system with a push button for each station in the processing facility or automatically by examining the amount of material already available at each boning station.

Figure 5:
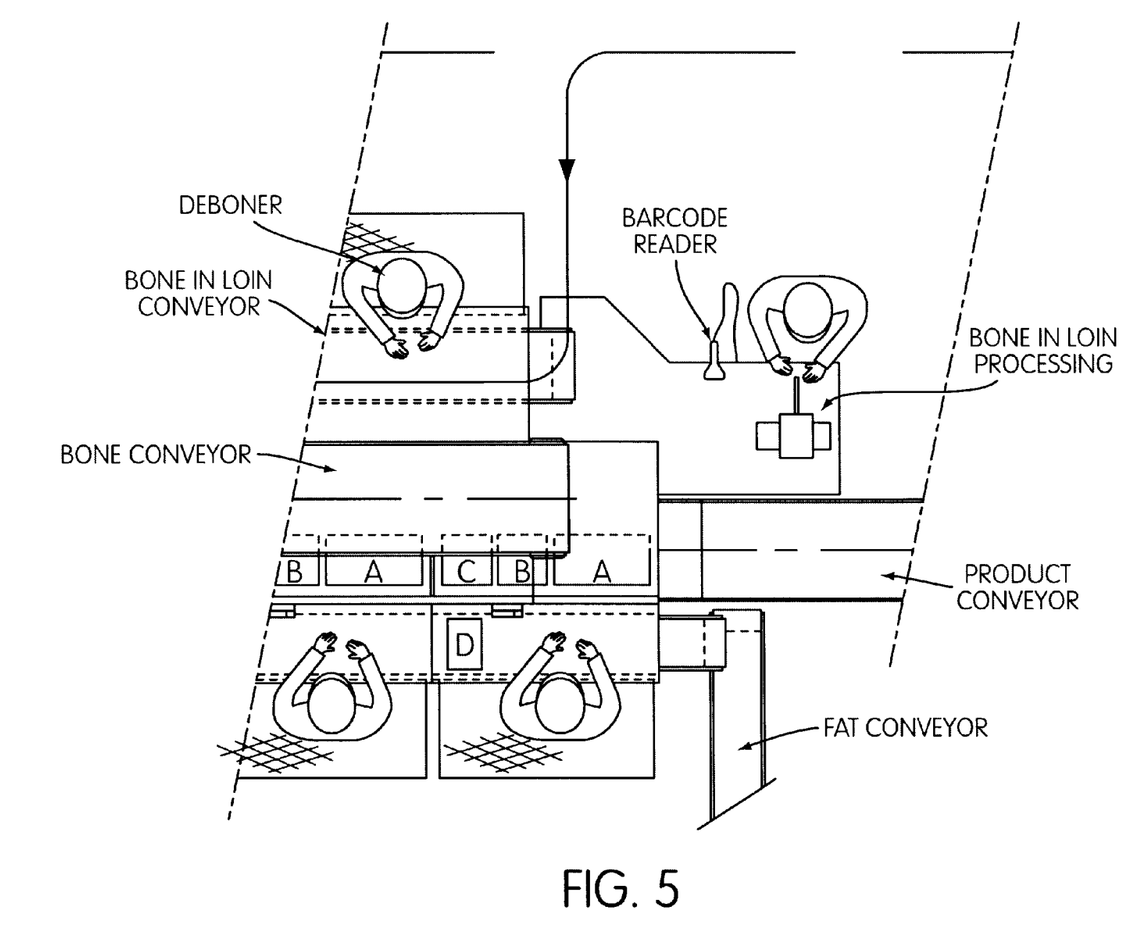
FIG. 5 shows a boning station.

FIG. 5 shows a boning station. The boning station consists of a boning table, platform, a bin for heel, conveyor for bone-in-loin (bones with meat) and two slicing stations. Optionally the boning station may have an information terminal described later. Quarters are brought to the boning station or to the slicing station from the pre-saw station. The boner de-bones the quarter and the cuts are distributed among the slicers according to a specified arrangement. Next quarter is processed and all cuts from the quarter are transferred to the other slicer. By means of this procedure it is easy to trace the meat back through the processing and to find out from which quarter or from which animal or farm a piece of meat originates.

The bones are moved to a bone container and only the amount is measured in order to calculate measures indicating the quality of the meat e.g. for paying the farmers according to the weight and/or quality.

Figure 3:
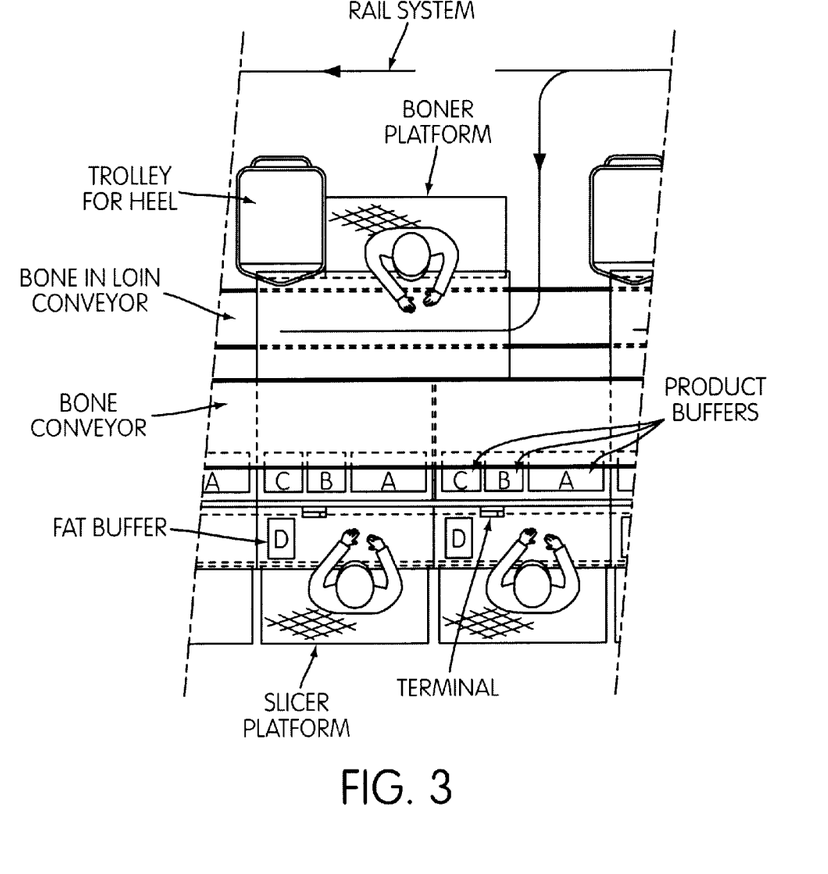
FIG. 3 shows two slicing stations and one de-boning station.

FIG. 3 shows a slicing station. The slicing station consists of a slicing table, platform, 3 product buffers and one fat buffer and optionally an information terminal. The meat from the boner lands on a product buffer on top of the slicing station.

One or more preferred ways of cutting is determined by the system. This is done automatically based on rules. The rules could be based on the weight of the full body, the fat percentage etc. Preferably the system determines a few ways of cutting the meat which may be selected from a selection menu. Based on the selection the terminal shows a picture of how the piece is to be cut into smaller pieces. The slicer typically has four bins. One is for trim type A, one is for trim type B, one is for fat and on e for primal cut. The primal and the trim type A and trim type B will be forwarded on a conveyor belt while the fat is thrown into a container for fat. The weight of the fat may—like the weight of the bones—be registered in order to trace the quality of the meat and in order to pay the farmers according to the quality of the meat.

For one specific product, e.g. a sirloin, the system knows e .g. a product ID, the type of cut, the type of animal, slicer ID, boner ID, time of processing, weight and QA-grade (Quality Assurance grade).

The slicer pulls the product from the product buffer to the slicing table and separates it into the different products (Primal cut, trim A, trim B, and fat). Buffers C and B are used for trim A and B and they are emptied on specific time intervals. Fat is inserted in buffer D and is released onto the fat conveyor on predetermined time-interval. Buffer A is used for primal products and each individual piece is traceable to originator. The operator creates the primal cut and places it into the buffer. When the primal cut is ready in the buffer the operator makes a confirmation to the system on a terminal or via a button system. The confirmation includes what type of product is to be released to the primal belt and fed to the dynamic scale. The system knows what quarter is being processed and therefore delivers the ID and other data to the central database.

At the scale 7 the information record is extended with the weight of the product.

The system can be further equipped with a QA station where the meat can be removed from the belt and can re-enter the belt without losing the information record of the meat. The QA station may add information to the information record, e.g. information related to the quality of the meat (fat percentage etc.) or information related to the performance of the workers (how the meat has been sliced etc.). The QA station takes samples from the belt adaptively. In the case in which a worker performs badly, the QA station will take more samples of meat that has been processed by that worker.

The pieces are typically sorted based on their weight and type before they are packed and finally labelled.

All the persons working in the meat processing facility could have a RF tag or similar tag that can be automatically read by a machine. When a person is working e.g. at a slicing station, the station can recognize the person by reading the ID-tag and thus the system can relate information about the worker to the meat being processed or relate information about the meat to an information file of the worker. The information record for the meat may be extended with information about the workers who have been processing the meat. Based on the information record, statistics can be performed not only for the meat but also for the workers such as how many pieces of meat the worker is processing in a time period, the quality of the meat processed by a worker etc.

The system may furthermore be connected to a system for paying for the meat and for paying the workers.

Figure 4:
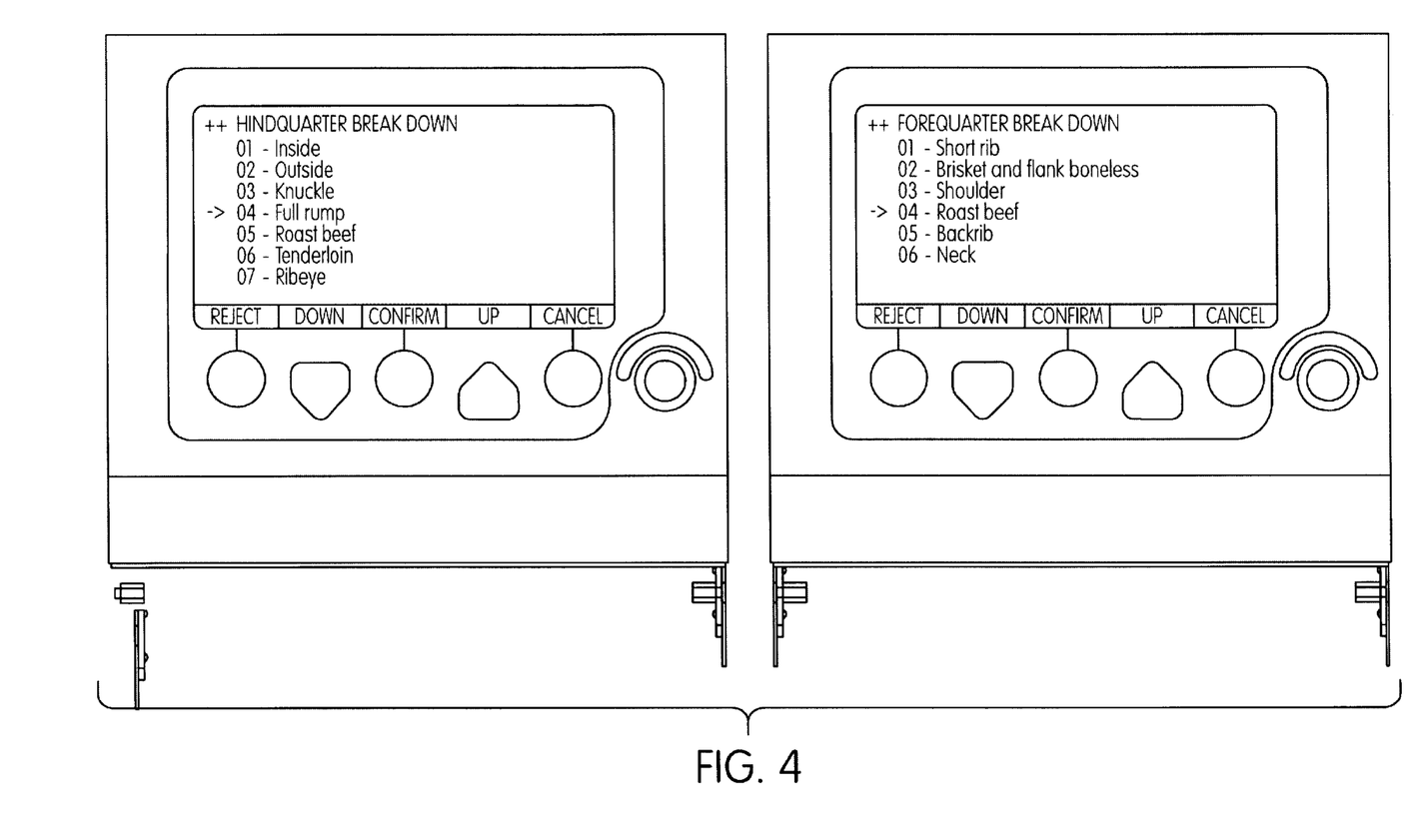
FIG. 4 shows a layout of a communication terminal.

FIG. 4 shows an example of a screen of an information terminal with a communication interface to an operator of a processing station. There are two different ways to indicate what primal is coming from the individual slicing stations, mainly a computer terminal or a button system.

A computer terminal is preferred due to an increased flexibility and by means of a computer screen it is possible to provide better guidance to the operator, e.g. by means of pictures showing different cuts. The terminal may provide pictures, text or drawings, such as drawings showing a hindquarter and a forequarter. The name of the product being processed is shown on the screen with a set of instructions matching the product, such as descriptions and/or drawings showing the operator how to cut the meat. Normally the slicer will cut the quarter in the same sequence and therefore the terminal may be given a default set up, including the processing sequence. E.g. a product list of cuts to be made in the sequence that a slicer prefers. In such a product list a pointer could point at the primal cut being processed and the terminal could indicate where each of the products in the list should be placed, e.g. in which product buffer.

Once a primal cut has been processed and a confirmation indicating that the product has been placed e.g. in product buffer A has been given via a conformation button on the terminal—the product line in the product list will be greyed out or disappear on the screen. By means of this function it may be indicated that the slicing table should be emptied and that all products from the specific quarter have been processed. Furthermore it is an indication to the operator that next quarter, e.g. a quarter with another origination ID can be processed.

The computer terminals may be adapted for the individual workers, E.g. when a worker enters a station, the station determines the ID of the worker by means of an R.F. tag. The system knows if the worker is skilled or un-skilled. Accordingly the amount of information and support being given to the worker by means of the computer terminal is adapted to the knowledge of the worker.

The terminals of the systems are connected to a computer system comprising a database system. The computer system handles all information related to the meat and the position of the meat. The computer system furthermore controls the conveyor system such as the servos, the ports redirecting the meat between different transportation belts etc. The computer system could be a regular PC (personal computer) running windows based software, or it could be a mainframe system or any similar system for information handling and machine control. Preferably the system consists of a number of interlocking modules, each module directly relating to a specific part of the production cycle, from quality control, grading and packing to trimming and time management. The modular architecture ensures that faults are easily detected and corrected without having to shut down the entire system. As all modules share a common core, the systems can be run either separately or as part of a full system. One major advantage is that the workers of the facility all share "up to the minute" information which can be used not only to control the equipment but also to support decisions on how to process a piece of meat, how to manage the facility e.g. how to employ new workers, when to have meat delivered and when to have meat shipped. From the database where all the information is stored, reports can be generated. Some reports are pre-specified and are available for the workers by simply pushing a button and selected workers, e.g. protected by a password can request other reports. A graphical user interface layer is adapted to present the information in a "user-friendly" way such as by means of drawings, graphs etc.

FIGS. 6–9 shows examples of reports presented by means of respectively graphical and textual interfaces.

Figure 6:
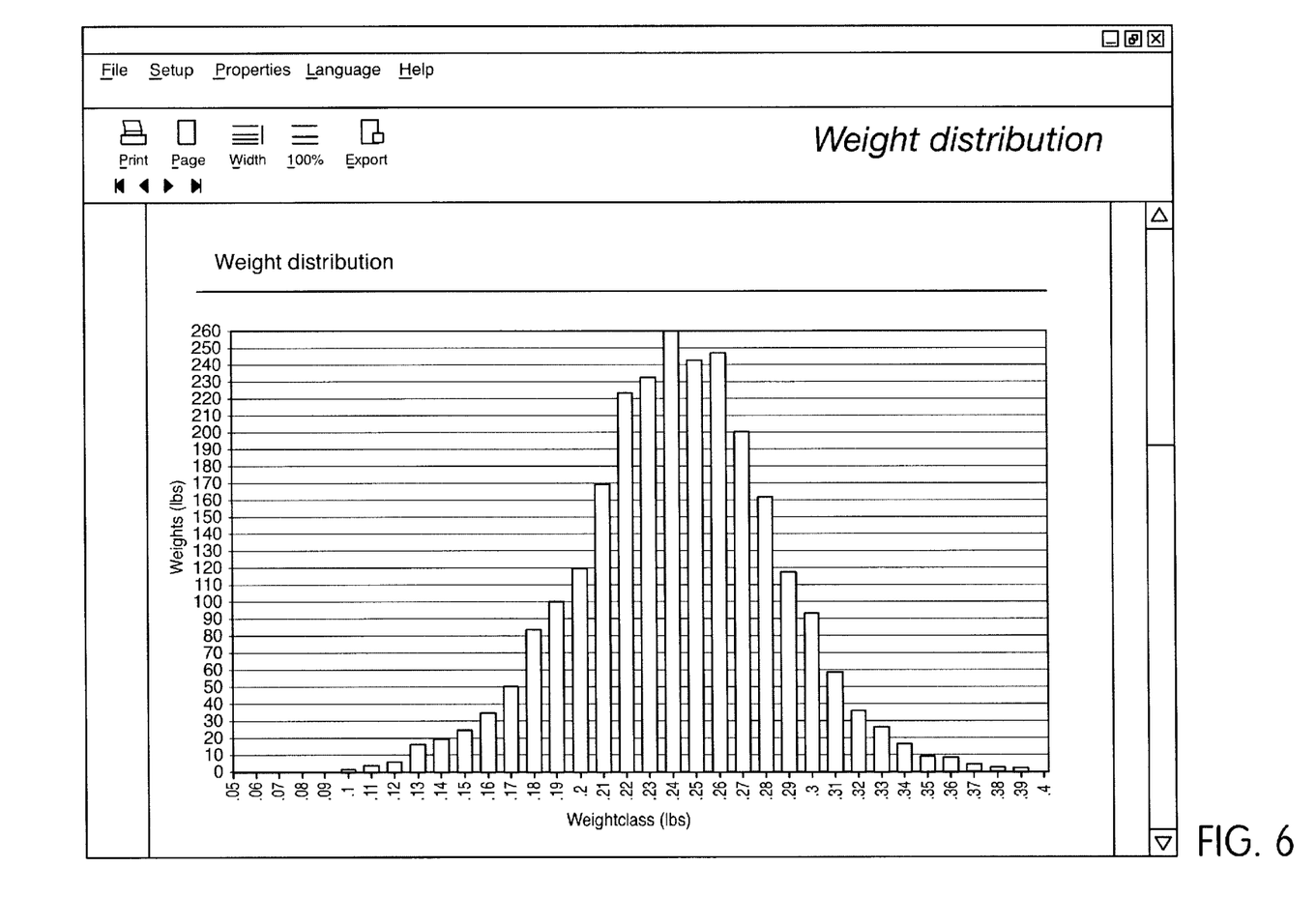
FIGS. 6–9 shows various reports.

FIG. 6 shows an interface for monitoring the entire production process by means of a weight distribution graph.

Figure 7:
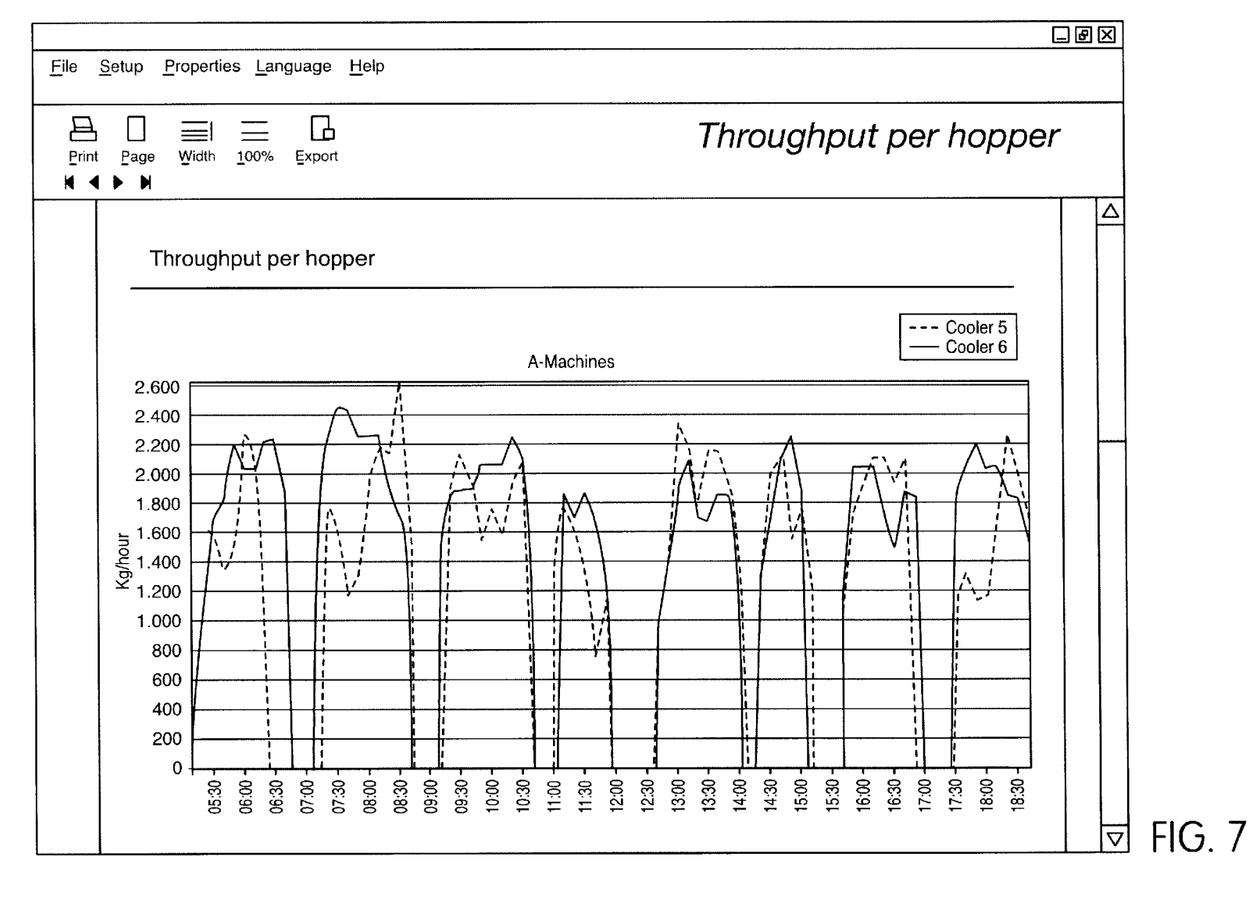

FIG. 7 shows an interface for monitoring the throughput e.g. for each hopper or bin, or for each worker.

Figure 8:
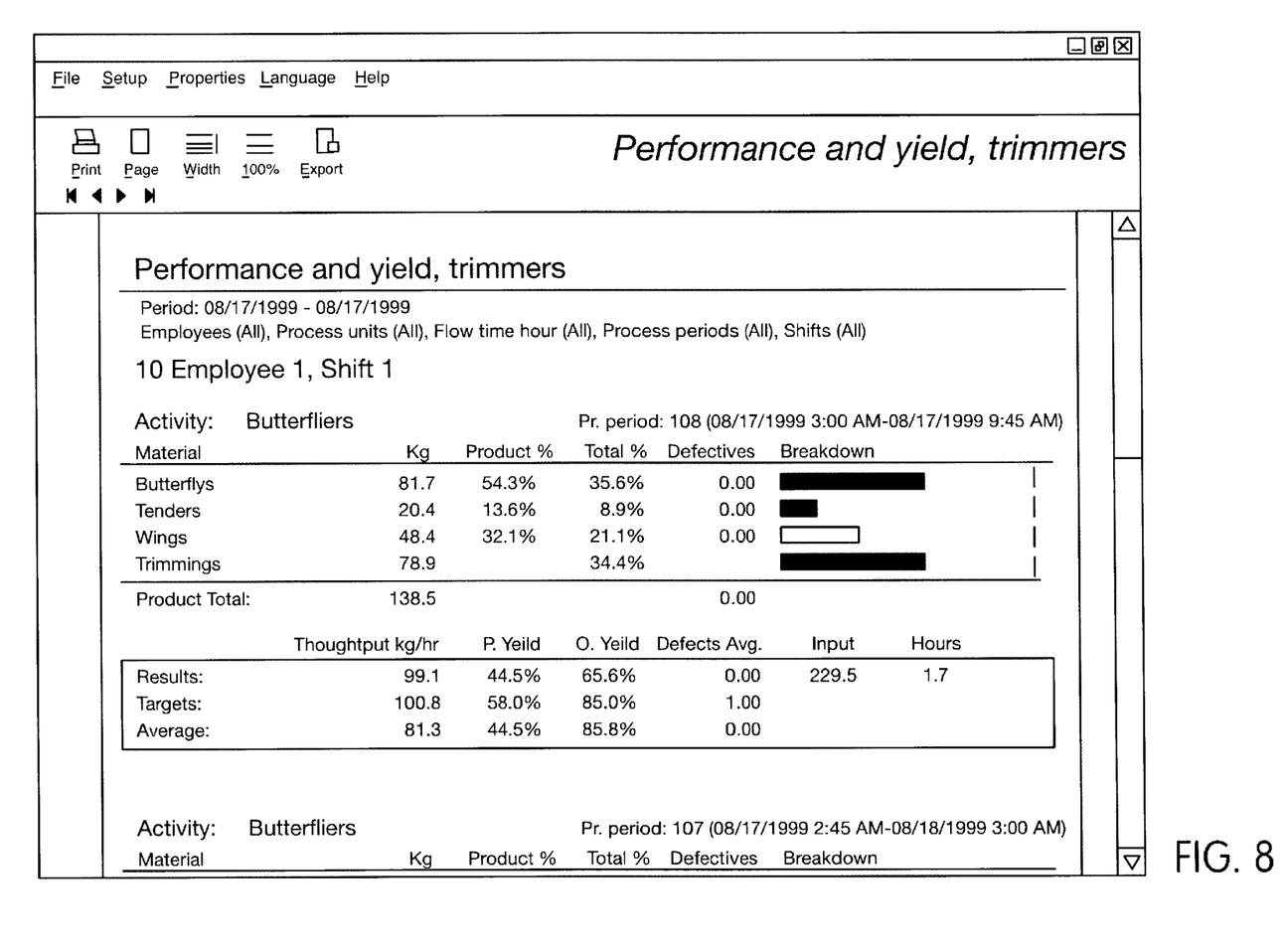

FIG. 8 shows in real-time the yield and output for each trimmer (worker performing trims) in the processing line.

The monitoring enables performance targets to be set for each of the workers.

Figure 9:
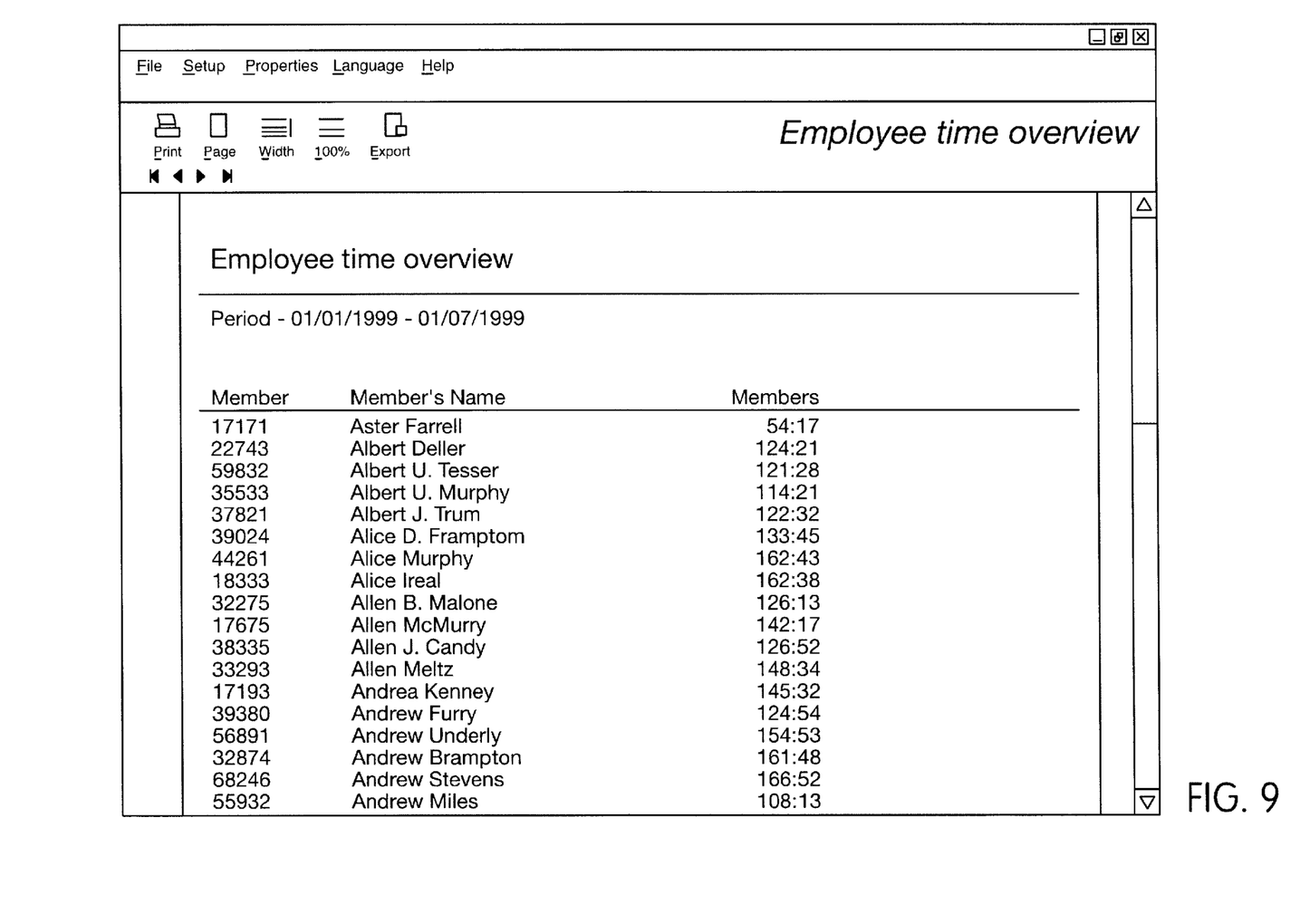

FIG. 9 shows a report for time management providing a range of personnel data and job tracing.

The description and drawings are only representative as an example of a preferred embodiment of the present invention and various implementations may be considered.

What is claimed is:

1. An integrated meat processing and information handling method for processing a meat product, said method comprising:

receiving a meat product at a receiving area;

obtaining information related to the meat product and storing the information in a computer system;

selecting at least one cutting rule for said meat product based on said information, wherein said at least one cutting rule is used for guidance in processing the meat product;

selecting at least one processing station to process said meat product;

providing said at least one processing station with said at least one cutting rule;

transferring said meat product between said at least one processing station, while tracking its position;

processing said meat product in terms of said at least one cutting rule into smaller meat products; and transferring said smaller meat products to a packing area, while tracking their position, wherein at the packing area each of said smaller meat products is provided with at least one information related to the initial meat product.

2. The method according to claim 1, wherein selecting at least one cutting station is performed by an operator.

3. The method according to claim 1, wherein an integrated meat processing area comprises:

a de-bone area, where the meat product is de-boned;

a slicing area, where said de-boned meat product is cut into smaller meat products; and a packing area for packing and labelling said smaller meat products, wherein said smaller meat products are provided with at least one information related to the initial meat product.

4. The method according claim 1, wherein the information related to the initial meat product comprises at least one of an identification number pointing to the origination the meat product, weight, fat percentage, type, and veterinarian inspection.

5. The method according to claim 4, wherein the meat product is weighed and a result stored in a computer system before entering said at least one processing station.

6. The method according to claim 1, further comprising:

cutting the meat product into at least two pieces, and storing in the computer system information related to said at least two pieces of cut meat.

7. The method according to claim 1, wherein processing said meat product in terms of said at least one cutting rule comprises cutting the meat product into smaller meat products.

8. The method according to claim 6, wherein a worker is provided with a graphical presentation of instructions of how to cut the meat product.

9. The method according to claim 8, wherein the graphical presentation is a graphical picture illustrating how to cut the meat product with the name of the meat product being processed and a set of instructions matching the meat product.

10. The method according to claim 1, wherein the smaller meat product is at least one of: fat, bones, trimmings, T-bones, sirloin, and primary products.

11. The method according to claim 1, wherein information related to the processing is stored in the computer system.

12. The method according to claim 11, wherein the information related to the processing is the quality of the processing.

13. The method according to claim 11, wherein the information related to the processing is the duration of the processing.

14. The method according to claim 11, wherein the information related to the processing is the time of the processing.

15. The method according to claim 11, wherein the information related to the processing is the yield of the processing.

16. The method according to claim 11, wherein the information related to the processing is the information related to a worker involved in the processing.

17. The method according to claim 11, wherein the information related to the processing is the performance of the worker.

18. A method according to claim 17, wherein the performance of the worker is compared with a reference measure stored in the computer system and wherein a log file comprising the comparison is stored in the computer system.

19. The method according to claim 1, wherein said smaller meat products are placed in at least one buffer.

20. The method according to claim 19, wherein the number of buffers is four, where one buffer is configured to store primal products, one buffer is configured to store fat and two buffers are configured to store trim.

21. The method according to claim 19, wherein at least one of said buffers is released on a predetermined time-interval.

22. The method according to claim 20, wherein once the primal product is ready in the buffer the operator makes a confirmation to the system.

23. The method according to claim 22, wherein the confirmation includes a type of smaller meat product to be released.

24. The method according to claim 22, wherein the confirmation includes an indication that all meat products have been processed.

25. The method according to claim 23, wherein the released smaller meat products are weighed and a result stored in the computer system.

26. The method according to claim 1, wherein the tracking comprises:

registering in the computer system information related to a position of a meat product;

forwarding the meat product to a processing station;

registering in the computer system information related to a sequence of meat products entering the processing station and smaller meat products leaving the processing station; and processing the information so as to determine the position of the meat product or the smaller meat products.

27. The method according to claim 1, wherein the station determines the identification of a worker by means of Radio Frequency tag once the worker enters a processing station.

28. The method according to claim 27, wherein the processing station determines whether the worker is skilled or un-skilled based upon said identification of the worker.

29. The method according to claim 1, further comprising examining the quality of the meat product and the processing at a quality control station, wherein the meat product can be removed from a conveyor belt and can re-enter the conveyor belt without losing the information record of the meat product.

30. The method according to claim 29, wherein said quality control station may add information to the information record such as information related to the quality of the meat product or information related to performance of the workers.

31. The method according to claim 29, wherein the quality control station takes more samples of meat product from a worker that has been careless in processing the meat products.

32. An integrated meat processing and information handling system for processing a meat product, said system comprising:

means for obtaining information related to the meat product;

storage means for electronically storing said information;

computing means for processing the stored information;

means for utilizing the stored information for selecting at least one cutting rule for guidance in processing the meat product;

tracking means for tracking a position of said meat product;

at least one processing station for processing the meat product in terms of said at least one cutting rule into smaller meat products;

transporting means for transporting said meat product between at least one processing station;

communicating means for communicating to the processing stations and the computing means; and means for transferring the processed meat product to a packing area where said processed meat product is packed and labelled with at least one of said information.

33. The system according to claim 32, wherein the computing means is a computer system connected to at least one processing station.

34. The system according to claim 33, wherein the computer system handles information related to the meat product and the position of the meat product and a conveyor system.

35. The system according to claim 32, further comprising an information terminal at the processing station configured to provide an operator with information relating to the processing of the meat.

36. The system according to claim 35, wherein said information terminal is a computer terminal.

37. The system according to claim 35, wherein the information terminal is controlled by the computer system.

38. The system according to claim 32, wherein the transporting means is a conveyor belt.

39. The system according to claim 32, wherein the tracking means is based on arranging a plurality of sensors in a number of places along a conveyor belt.

40. The system according to claim 39, wherein the tracking means is based keeping track on index pulses in a conveyor system.

41. The system according to claim 32, further comprising a weighing means for weighing the meat product or the smaller meat products.

42. The system according to claim 32, further comprising a weighing means for weighing the smaller meat product.

43. The system according to claim 41, wherein the weighing means is at least one of a dynamic scale and a static scale.

44. The system according to claim 32, further comprising a packing station for packing and labelling packed smaller meat products.

45. The system according to claim 44, wherein the processing station comprises:

at least one de-bone station, where said meat product is de-boned, at least one slicing station, where said de-boned meat product is processed into smaller meat products, and at least one packing station for packing and labelling said smaller meat products.

46. The system according to claim 45, wherein at least one of the processing station is configured to read an identification information from an operator.

* * * * *